UNITED STATES PATENT OFFICE.

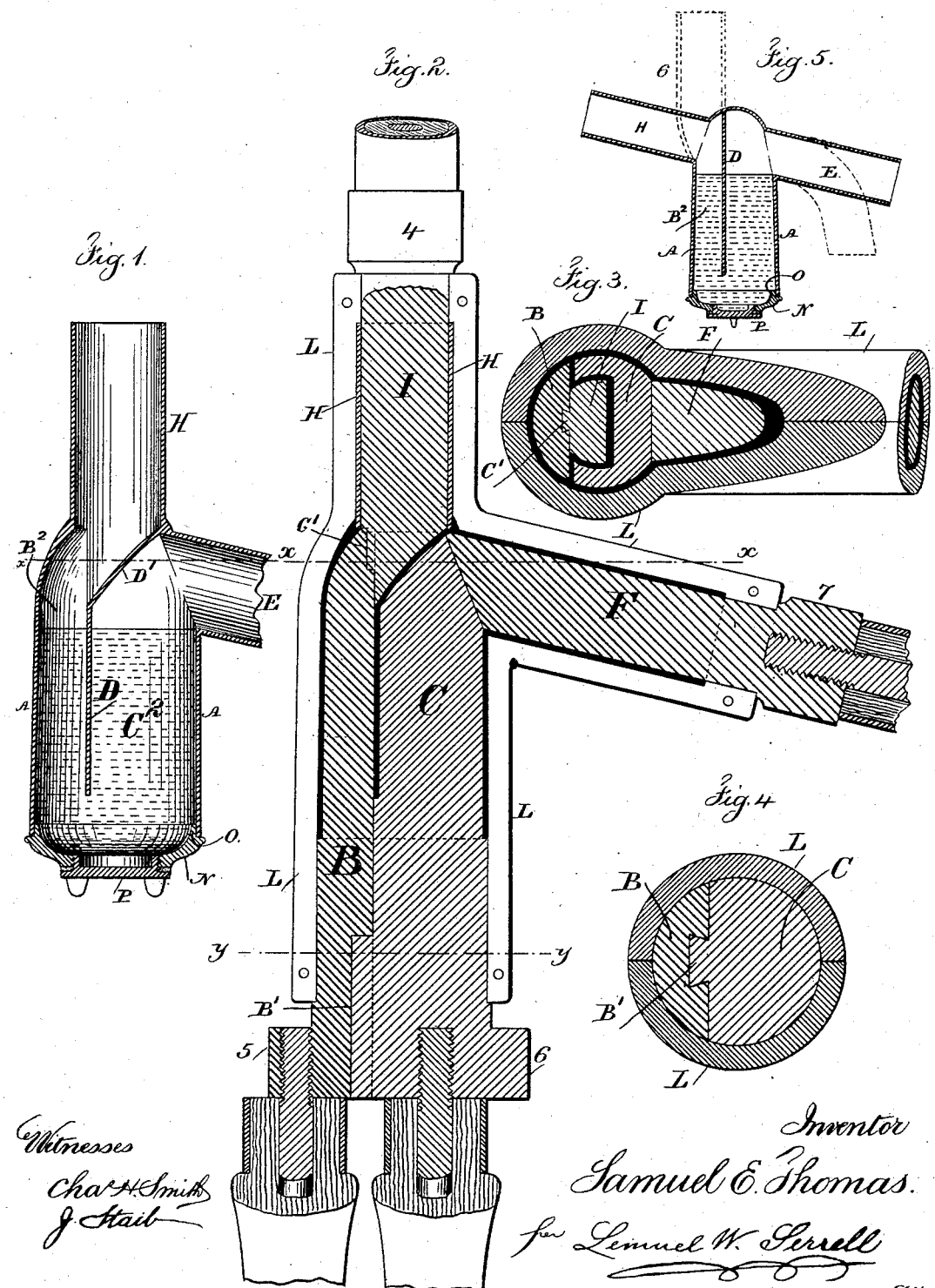
(No Model.)
S. E. THOMAS.
WASTE TRAP FOR BASINS, CLOSETS, &c.
No. 371,107. Patented Oct. 4, 1887.

SAMUEL E. THOMAS, OF BROOKLYN, NEW YORK.

WASTE-TRAP FOR BASINS, CLOSETS, &c.

SPECIFICATION forming part of Letters Patent No. 371,107, dated October 4, 1887.

Application filed January 3, 1887. Serial No. 223,168. (No model.)

*To all whom it may concern:*

Be it known that I, SAMUEL E. THOMAS, of Brooklyn, in the county of Kings and State of New York, have invented an Improvement in Waste-Traps for Basins, Sinks, &c., of which the following is a specification.

This improvement relates to a waste-trap in which the body of the trap is made with cylindrical or nearly cylindrical sides, in order that the core upon which the same is cast may easily be withdrawn, and in this cylindrical body is a partition terminating at a sufficient distance above the lower end of the body to allow the water to pass below its lower end, and the outlet of the trap is at one side of the body and cast with it. The inlet of the trap is usually at the top, the body of the trap being contracted to meet the inlet-pipe; but in "running traps" the inlet-pipe is at the opposite side to the discharge-pipe. At the lower end of the trap-body a ring, of brass or similar cast metal, is soldered to place, and it is provided with an internal screw-thread to receive a removable screw-cap that gives access to the trap. The inlet-pipe is wrought-lead inserted into the mold, so that the end thereof is melted or soldered to the body of the trap. This wrought-lead pipe, being more ductile than the cast metal, can be spread or flanged without cracking, so as to be united with the basin or sink in the ordinary manner.

In the drawings, Figure 1 is a vertical section of the trap complete. Fig. 2 is a section corresponding in position, and showing portions of the cores and mold for casting the trap. Fig. 3 is a cross-section at the line $x\ x$ of Figs. 1 and 2; and Fig. 4 is a cross-section at the line $y\ y$, Fig. 2. Fig. 5 is a section showing my improvements as applied to a running trap.

In Figs. 2 and 3 the heavy black lines indicate the spaces into which the lead is to be cast.

The body A of the trap is nearly cylindrical, the taper being only sufficient to allow the cores B and C to be withdrawn after the trap has been cast. The partition or dam D is not central, but is preferably nearest to the inlet side of the trap, so that there will be a greater body of water upon the outer side of the trap, and the risk of siphoning will thereby be lessened.

The outlet-pipe E is either straight, as shown by full lines in Fig. 1, or it may be curved to form an S-trap, as indicated by dotted lines in Fig. 5. This outlet-pipe E is cast with the body A, and when the same is straight it is cast around a slightly tapering core, F, that is inserted into the mold, as indicated in Fig. 2.

The upper end of the body of the trap is dome-shaped, and in the trap shown in Fig. 1 the inlet-pipe H is at the upper part of the dome; but with a running trap the inlet-pipe will come at one side of the dome, as indicated in Fig. 5. This inlet-pipe H is formed of a piece of wrought-lead pipe, as ordinarily made by a hydraulic press, the same being cut off of the proper length, and the end which is adjacent to the trap-body is to be cleaned upon its exterior and interior surfaces and tinned, and this piece of wrought-lead pipe is passed over the core I and placed so that the inner end thereof comes within the mold L. This mold L is made in two parts, and corresponds to the exterior shape of the trap, and it is adapted to receive and hold the cylindrical end portions or stocks of the respective cores, and these cores are provided with handles by which to move them after the parts have been cast, and there are usually projections at 4, 5, 6, and 7 upon the cores, so that the necessary power can be applied for withdrawing them from the cast trap.

Upon reference to Figs. 1 and 2, it will be seen that the edges of the partition or dam D where they unite with the body A of the trap above the lower end of the dam are in a straight line or plane, and that the portion D' of the dam is at an inclination toward the delivery-pipe E. This allows the opening from the inlet-pipe to pass to the inlet side of the dam, and gives a free lateral and downward discharge for the water, and at the same time it allows the core of the inlet-pipe to be united with the core that occupies the narrower space in the trap-body; and this core I of the inlet-pipe can be withdrawn before the core B is removed. The dam is complete and continuous without either obstructing the inlet-pipe or requiring any separate removable sections in the core C of the body of the trap. This greatly facilitates the placing together of the molds and core and the separation of the parts after the casting has been effected. It is preferable to hold the two parts C and B of the core together by the dovetail projection and recess at B', and to connect the end of the core I with the end of the core B by a dovetail block at C'.

The ring N is preferably of brass, cast with a cylindrical flange, O, passing within the lower end of the body of the trap, at which place the ring is firmly soldered, and there is a screw-thread at the inside of the ring for the reception of the movable cap P, for giving access to the trap for cleaning.

This trap is strong and reliable, and is comparatively inexpensive to construct, and the inlet-pipe I, being of wrought metal, can be spread or enlarged in the usual manner for receiving the connection to the sink or basin. The dam permits a free passage of the water below its lower end, and the outlet side $C^2$ of the trap, being the largest, allows the same to hold such a body of water that siphoning is prevented.

This improvement, although especially adapted to waste-traps for sinks or basins, may be used with water-closets when made sufficiently large.

If desired, the inlet pipe may not be on the line of the axis of the body, but in line with the inlet side $B^2$, as shown by the dotted lines at 6, Fig. 5.

The body of the trap is shown as circular in section; but it may be oval or polygonal, so long as the sides are parallel, or nearly so, as shown.

The cast-metal ring N strengthens the bottom end of the trap-body at the place where there is the most liability for concussion and injury. This ring may be of any desired shape, and the trap-screw may be larger or smaller in diameter than that shown.

I claim as my invention—

1. The waste-trap having a nearly cylindrical body, A, a discharge-pipe, E, near the top, and vertical partition within the cylindrical body, forming a dam, D, in combination with a screw-ring fitting the lower edges of the cylindrical body and soldered thereto, and the cap P, screwed into the same, substantially as set forth.

2. The waste-trap having a cylindrical body, a discharge-pipe at one side thereof, and a vertical partition within the body, forming a dam, all of cast metal, and an inlet-pipe of wrought-lead, the end of which is connected to the body of the cast-metal trap, substantially as set forth.

3. The method herein specified of forming lead traps, consisting in placing in the mold and around the core a piece of wrought-lead pipe, with the end portion thereof tinned, and casting into the mold and around the cores the metal that forms the body of the trap and the outlet-pipe, so that the melted metal unites with the end of the wrought-lead pipe, and then removing the respective cores, substantially as set forth.

Signed by me this 30th day of December, A. D. 1886.

S. E. THOMAS.

Witnesses:
 GEO. T. PINCKNEY,
 WILLIAM G. MOTT.